(12) United States Patent
Okumura

(10) Patent No.: US 6,529,323 B2
(45) Date of Patent: Mar. 4, 2003

(54) SHEET TAKE-UP DEVICE FOR A PROJECTION SCREEN AND THE LIKE

(76) Inventor: Keiichi Okumura, 4-49-8, Fujisakahigashimachi, Hirakata-shi, Osaka (JP)

( * ) Notice: Subject to any disclaimer, the term of this patent is extended or adjusted under 35 U.S.C. 154(b) by 0 days.

(21) Appl. No.: 09/946,519

(22) Filed: Sep. 6, 2001

(65) Prior Publication Data

US 2002/0048083 A1 Apr. 25, 2002

(30) Foreign Application Priority Data

Oct. 24, 2000 (JP) ........................................ 2000-007607

(51) Int. Cl.$^7$ .................. G03B 21/56; F16D 21/00; F16D 23/00; F16H 57/00; E06B 9/56
(52) U.S. Cl. ..................... 359/461; 359/443; 192/89.27; 192/223.2; 160/297; 160/305
(58) Field of Search ................................ 359/443, 461; 396/3; 192/89.27, 223.2; 160/297, 305

(56) References Cited

U.S. PATENT DOCUMENTS

| | | | | |
|---|---|---|---|---|
| 3,942,868 A | * | 3/1976 | Brown ......................... 359/461 |
| 4,072,404 A | * | 2/1978 | Christoffel .................. 359/461 |
| 4,159,162 A | * | 6/1979 | Shaw .......................... 359/461 |
| 4,345,636 A | * | 8/1982 | Fukuchi ....................... 160/297 |
| 4,406,519 A | * | 9/1983 | Weinberg ..................... 359/443 |
| 4,416,511 A | * | 11/1983 | Chigusa et al. ............. 359/461 |
| 4,838,333 A | * | 6/1989 | Mottura ....................... 160/305 |
| 5,099,906 A | * | 3/1992 | Shopp .......................... 160/297 |
| 5,413,201 A | * | 5/1995 | Vidal .......................... 192/69.41 |
| 5,548,356 A | * | 8/1996 | Shopp .......................... 353/13 |
| 5,566,741 A | * | 10/1996 | Benthin ........................ 160/297 |
| 5,586,631 A | * | 12/1996 | Ogawara et al. .......... 192/223.2 |
| 5,798,861 A | * | 8/1998 | Doat ........................... 359/461 |
| 6,206,164 B1 | * | 3/2001 | Kurita ......................... 192/223.2 |

* cited by examiner

*Primary Examiner*—Russell Adams
*Assistant Examiner*—Magda Cruz
(74) *Attorney, Agent, or Firm*—Wenderoth, Lind & Ponack, L.L.P.

(57) ABSTRACT

To provide a sheet take-up device for a projection screen and the like, said device being capable of simplifying the device in structure by omitting a one-way clutch and reducing components in number and capable of smoothly drawing out and taking up a sheet.

An endless cam groove 12 is provided on the outer circumferential face of a cam spline 3 being movable in the axial direction, a changeover ball 14 turning as one body with a take-up drum 5 is made to engage with this cam groove 12, a take-up elastic force providing means 18 for accumulating elastic energy in the sheet take-up direction for the take-up drum 5 by turning in the draw-out direction of the take-up drum 5 is provided between a support shaft 1 and the take-up drum 5, and the endless cam groove 12 provided on the outer circumferential face of said cam spline 3 is formed out of a draw-out groove 24 and a take-up groove 25 which are spaced in the axial direction and ring-shaped in the circumferential direction, and an engagement groove 26 and a return groove 27 making the draw-out groove 24 and the take-up groove 25 communicate with each other.

4 Claims, 5 Drawing Sheets

(A)

(B)

(C)

(D)

(E)

(F)

SHEET TAKE-UP DEVICE FOR A PROJECTION SCREEN AND THE LIKE

BACKGROUND OF THE INVENTION

1. Field of the Invention

The present utility model relates to a sheet take-up device for a projection screen and the like which can freely set the support position of a sheet such as a projection screen and the like drawn out, can take up the sheet by only drawing down slightly and then releasing the sheet, can shorten the length of drawing out for this drawing down, and can prevent the operation of drawing out or taking up the sheet from being interrupted on the way in spite of its simple structure.

2. Description of the Related Art

There is a demand on a sheet take-up device for a projection screen and the like that it is possible to freely set the support position of a sheet drawn out and shorten the length of drawing out the sheet when taking up the sheet, and in order to cope with this demand various mechanisms have been proposed up to now and for example, Japanese Utility Model Publication No. Hei 7-2533 is also one of them.

This sheet take-up device is provided with a guide drum outside a support shaft and a drum for taking up a sheet outside this guide drum, supports the drum turnably on the support shaft by energizing the drum in the sheet take-up direction, supports the guide drum on the support shaft so as to be turnable only in the sheet draw-out direction by interposing a one-way clutch between the support shaft and the guide drum, provides an endless cam groove on the outer circumferential face of said guide drum, and interposes a changeover ball engaged with the cam groove between the drum and the guide drum so as to be freely move in the axial direction of the guide drum.

In this sheet take-up device, when the sheet is drawn out the drum is turned in the sheet draw-out direction, and when the drawing of the sheet is cancelled the drum is turned in the sheet take-up direction and the changeover ball is moved to engage with the fixing engagement portion of the cam groove and the one-way clutch operates to regulate turning of the drum in the sheet take-up direction and the sheet is supported in a hanging state.

And in order to take up the sheet drawn out, it is enough to slightly draw out the sheet and cancel the drawing of the sheet at the point of time when the changeover ball is engaged with the temporary engagement portion of the cam groove, and the changeover ball is moved to the return groove of the cam groove by a turning force energized in the drum, and the engagement of the drum with the guide drum is released and the drum is turned in the sheet take-up direction and thereby the sheet is taken up.

By the way, since such a sheet take-up device as described above adopts a one-way clutch to stop and hold the drum when the sheet is supported in a hanging state, it needs a ratchet wheel, a ratchet pawl and the like, and has a problem that the device is made high in manufacturing cost due to not only the increase in number of components but also the complication in structure of it.

And the structure in which a guide drum having a cam groove is fixedly arranged and a changeover ball is moved in the axial direction of the guide drum has a problem that resistance occurs when the changeover ball is moved and it is difficult to smoothly draw out and take up the sheet.

Thereupon, an object of this utility model is to provide a sheet take-up device for a projection screen and the like which makes it possible to omit a one-way clutch, simplify said device in structure by reducing components in number, and smoothly draw out and take up a sheet.

SUMMARY OF THE INVENTION

In order to solve such a problem as described above, the present utility model provides a sheet take-up device for a projection screen and the like, comprising a cam spline which is attached to a fixed support shaft so as to be unable to turn and able to move in the axial direction and has an endless cam groove provided on its outer circumferential face, a cam holder supported on the outer circumferential face of this cam spline so as to be able to turn, a sheet take-up drum fixed to the outer circumferential face of the cam holder so as to turn as one body with said cam holder, a changeover ball held by said cam holder at a fixed position so as to engage with said cam groove, and a take-up elastic force providing means which is provided between said support shaft and said take-up drum and accumulates the elastic energy in the sheet take-up direction for the take-up drum by the rotation in the sheet draw-out direction of the take-up drum, wherein said endless cam groove provided on the outer circumferential face of said cam spline is formed out of a draw-out groove and a take-up groove which are spaced in the axial direction and ring-shaped in the circumferential direction, and an engagement groove and a return groove which make said draw-out groove and said take-up groove communicate with each other, said engagement groove is provided with a fixing engagement portion for making the cam spline and the changeover ball engage with each other so as not to turn the take-up drum in the sheet take-up direction and a changeover engagement portion for releasing said engaged state by turning of the changeover ball in the sheet take-up direction, said fixing engagement portion and changeover engagement portion being curved in directions opposite to each other with respect to the circumferential direction of the cam spline, said take-up groove moves the cam spline so that the return groove advances to the changeover ball by turning of the changeover ball in the sheet draw-out direction, said return groove moves the cam spline so that the draw-out groove advances to the changeover ball by turning of the changeover ball in the sheet draw-out direction, and said draw-out groove moves the cam spline so that the engagement groove advances to the changeover ball by turning of the changeover ball in the sheet draw-out direction.

Here, a structure can be adopted in which said cam spline is fitted onto the outer circumference of a spline shaft fitted and fixed onto the support shaft so as to be unable to turn and is coupled with the spline shaft so as to able to freely move in the axial direction and unable to turn relative to the spline shaft by interposing balls between spline grooves respectively provided in the inner circumferential face of the cam spline and in the outer circumferential face of the spline shaft.

And a structure may be adopted in which a speed regulating mechanism for regulating the turning speed in the sheet take-up direction of the take-up drum so that the turning speed does not become too high is provided between said support shaft and said take-up drum, and this speed regulating mechanism is formed using an oil rotation damper.

DETAILED DESCRIPTION OF THE PREFERRED EMBODIMENTS

Figure 1:
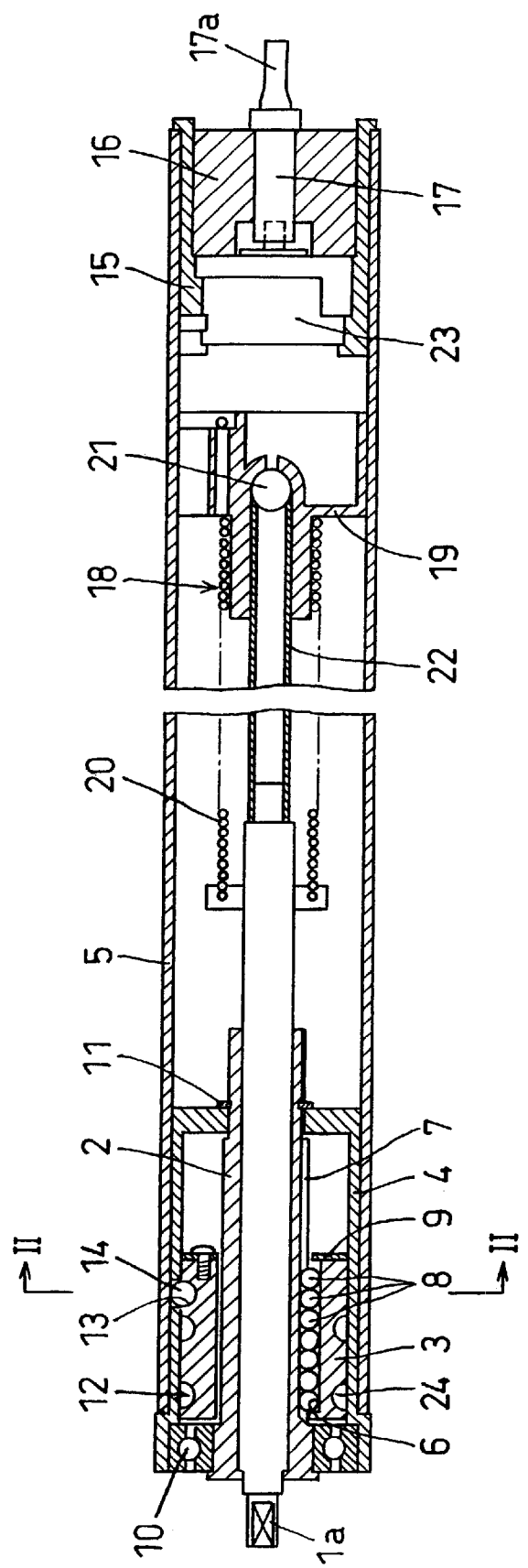
FIG. 1 is a longitudinal sectional front view of a sheet take-up device for a projection screen and the like according to the present utility model.
Figure 2:
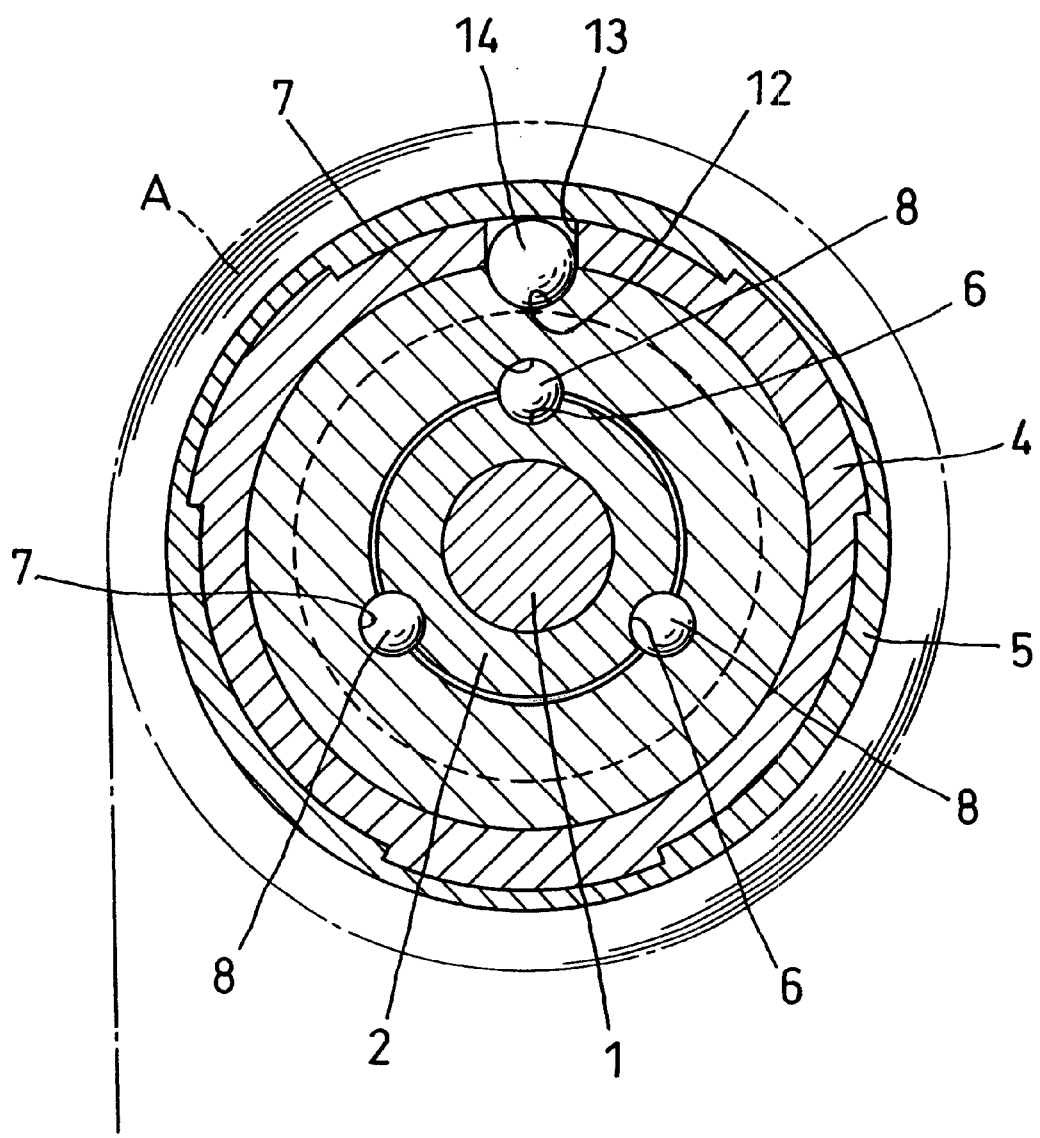
FIG. 2 is a longitudinal sectional view taken along arrows II—II.
Figure 3:
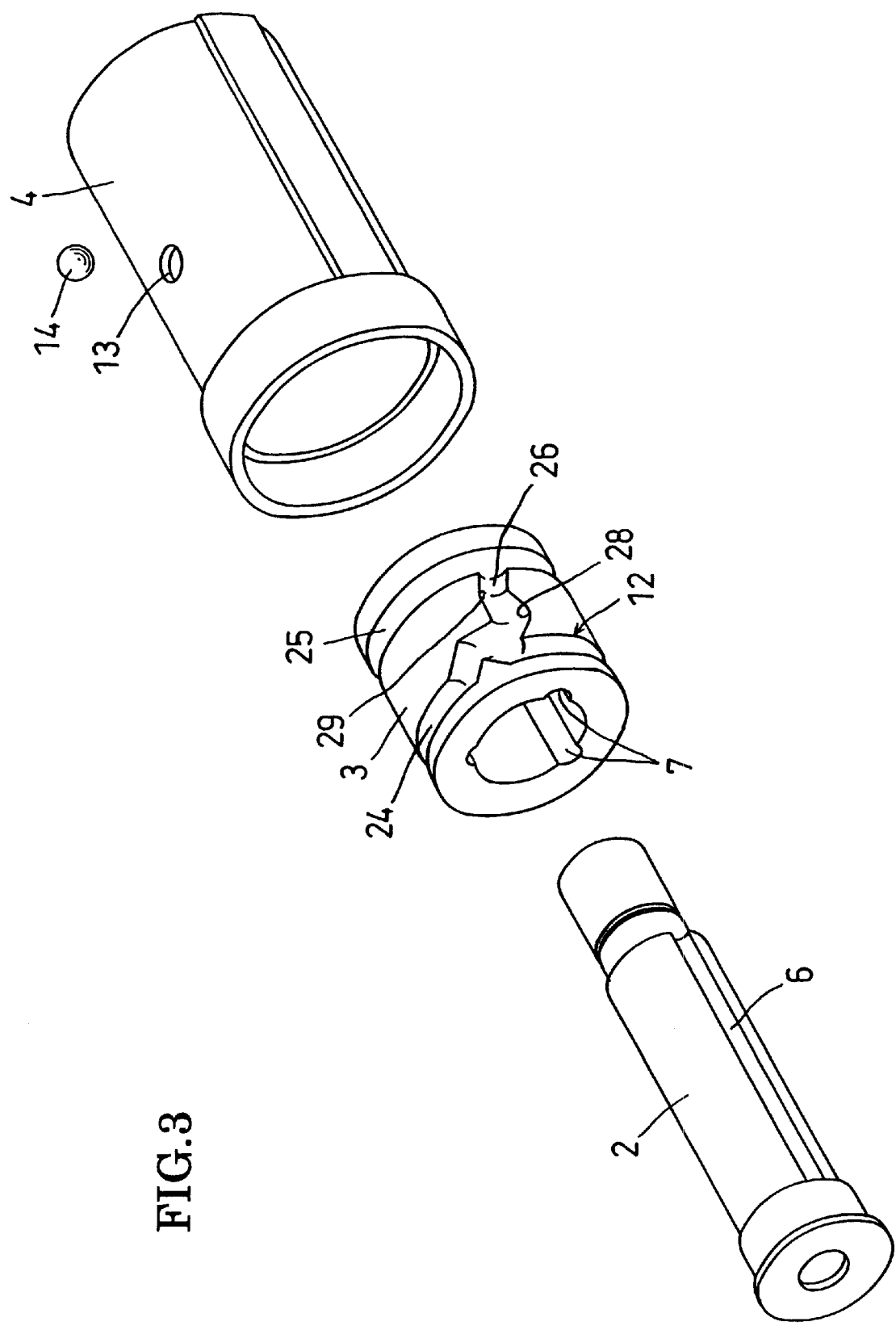
FIG. 3 is an exploded perspective view showing a main part of a sheet take-up device for a projection screen and the like according to the present utility model.

An embodiment of the present utility model is described with reference to the illustrations in the following.

As illustrated, a tube-shaped spline shaft 2 made of resin is fitted and fixed onto a first support shaft 1 fixedly arranged so that said spline shaft 2 is unable to turn, a cam spline 3 made of resin in the same way is fitted so as to be able to move in the axial direction and unable to turn onto the outside of the spline shaft 2, a cam holder 4 made of resin is fitted onto the outside of this cam spline 3 so as to be able to turn, and one end portion of a take-up drum 5 of a sheet A is fitted and fixed onto the outer circumferential face of the cam holder 4 so as to turn as one body with the cam holder 4.

Said spline shaft 2 and said cam spline 3 have respectively a plurality of spline grooves 6 and 7 in the axial direction on the outer circumferential face of the spline shaft 2 and on the inner circumferential face of the cam spline 3, and interpose a plurality of balls 8 over both spline grooves 6 and 7, and hold the balls 8 by a lid member 9 fixed on the end face of the cam spline 3 so as not to be slipped away and thereby they are joined together in the circumferential direction and the cam spline 3 can be freely moved in the axial direction relative to the spline shaft 2.

And the cam holder 4 is turnably supported at one end of it on one end portion of the spline shaft 2 through a bearing 10 and is turnably supported at the other end by a stop ring 11 on the other end portion of the spline shaft 2 so as not to move in the axial direction, and thereby is freely turnable relative to said cam spline 3, and the cam spline 3 is freely movable in the axial direction inside the cam holder 4 and has an endless cam groove 12 provided on the outer circumferential face of this cam spline 3, and a changeover ball 14 engaging with said cam groove 12 is held at a specific position by a through hole 13 provided in the cam holder 4.

Said take-up drum 5 has a length corresponding to the width of a sheet A to be taken up, has a sleeve-shaped holder 15 made of resin fitted and fixed so as to be turned as one body with it inside the other end portion of it, and turnably supports a second support shaft 17 with a bearing 16 made of resin fitted and fixed inside this sleeve-shaped holder 15.

This second support shaft 17 and said first support shaft 1 are coaxially arranged, and the take-up drum 5 is turnably arranged in a state where it is supported at both end of it by the first support shaft 1 and the second support shaft 17 by supporting square shaft portions 1a and 17a of the first support shaft 1 and second support shaft 17 projecting from the end portions of the take-up drum 5 so as to be unable to turn by brackets fixed on a wall face, a ceiling and the like.

And a take-up elastic force providing means 18 for accumulating an elastic energy in the sheet take-up direction for the take-up drum 5 by turning of the take-up drum 5 in the sheet draw-out direction is built in the take-up drum 5.

This elastic force providing means 18 is formed by providing a spring receiver 19 made of resin inside the take-up drum 5 so as to be able to turn as one body with the take-up drum 5 and move in the axial direction, fixing a coil spring 20 fixed at one end of it to the spring receiver 19 at the other end to the first support shaft 1, and providing an approach regulating shaft 22 for the spring receiver 19 between a ball 21 turnably accommodated inside the spring receiver 19 and the opposite face of the first support shaft 1, and when the take-up drum 5 is turned in the sheet draw-out direction, the coil spring 20 is tightly wound up to accumulate elastic energy between the spring receiver 19 turned as one body and the fixed first support shaft 1 and results in accumulating the elastic energy in the sheet take-up direction for the take-up drum 5.

And a speed regulating mechanism 23 located between the second support shaft 17 and the take-up drum 5 for regulating the turning speed in the sheet take-up direction of the take-up drum 5 so as not to become too high is provided inside the sleeve-shaped holder 15 fixed to the other end portion of said take-up drum 5, and this speed regulating mechanism 23 is formed using an oil rotation damper.

Figure 4:
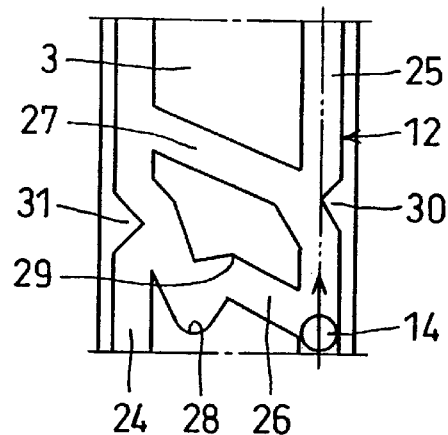
FIGS. 4[A] to 4[C] show the relation between the cam groove of the cam spline and movement of the changeover ball.
Figure 4:
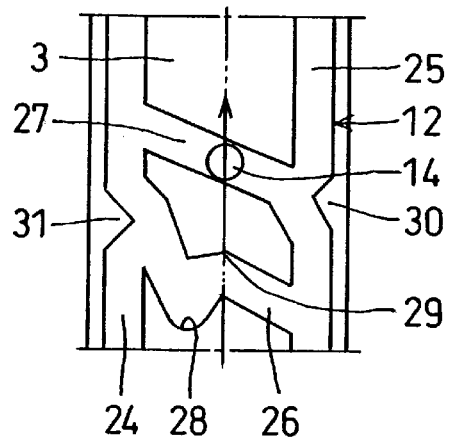
Figure 4:
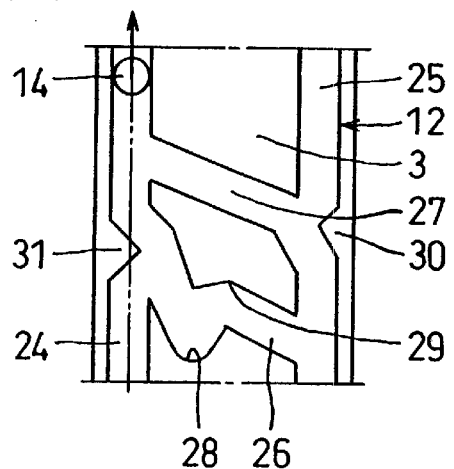
Figure 5:
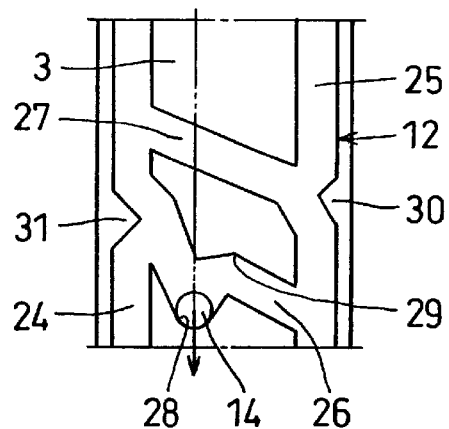
FIGS. 5[D] to 5[F] show the relation between the cam groove of the cam spline and movement of the changeover ball.
Figure 5:
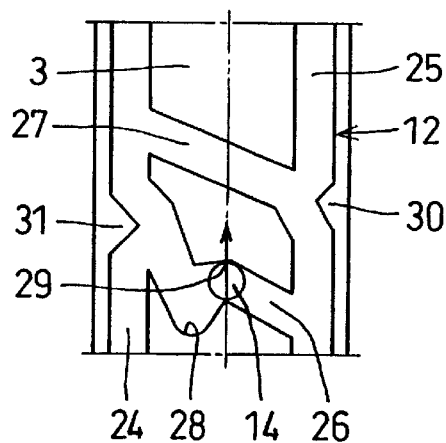
Figure 5:
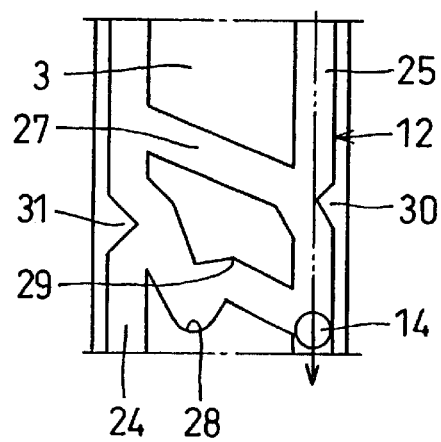

As developed and shown in [A] to [F] of FIGS. 4 and 5, the endless cam groove 12 provided on the outer circumferential face of said cam spline 3 is formed out of a draw-out groove 24 and a take-up groove 25 which are spaced in the axial direction and ring-shaped in the circumferential direction, and an inclined engagement groove 26 making the draw-out groove 24 and the take-up groove 25 communicate with each other and a return groove 27 being close to and in parallel with this engagement groove 26.

Said engagement groove 26 is provided with a fixing engagement portion 28 for engaging the can spline 3 and the changeover ball 14 with each other to prevent the take-up drum 5 from turning in the take-up direction of the sheet A and a changeover engagement portion 29 for releasing said engaged state by turning of the changeover ball 14 in the sheet draw-out direction on the way of said engagement groove 26, said fixing engagement portion 28 and changeover engagement portion 29 being curved in the opposite directions to each other with respect to the circumferential direction of the cam spline 3, and the return groove 27 is formed into a straight inclined groove.

Said take-up groove 25 makes a bent portion 30 projecting toward the return groove 27 at a position facing the return groove 27 and moves the cam spline 3 so that the return groove 27 advances to the changeover ball 14 by turning of said changeover ball 14 in the draw-out direction of the sheet A, and the return groove 27 moves the cam spline 3 so that the draw-out groove 24 advances to the changeover ball 14 by turning of said changeover ball 14 in the sheet draw-out direction, and the draw-out groove 24 makes a bent portion 31 projecting toward the engagement groove 26 at a position facing the engagement groove 26 and moves the cam spline 3 so that the engagement groove 26 advances to the changeover ball 14 by turning of said changeover ball 14 in the sheet take-up direction.

Accordingly, said cam spline 3 results in moving in the axial direction by the interval between the draw-out groove 24 and the take-up groove 25 by turning of the changeover ball 14 held at a specific position by the cam holder 4 together with this cam holder 4 in the circumferential direction of the cam spline 3.

The sheet take-up device of the present utility model has such a composition as described above, and its operation of drawing out and taking up a sheet A is described in the following.

First, in a state where a sheet A has been taken up by the take-up drum 5, as shown in FIG. 4[A], the relation between the cam spline 3 and the changeover ball 14 is in a phase in which the take-up groove 25 of the cam spline 3 is engaged with the changeover ball 14, and as shown in FIG. 1 the cam spline 3 is leftmost in the same figure relative to the changeover ball 14.

When the sheet A is drawn out in this state, the take-up drum 5 is turned in the draw-out direction around the support shafts 1 and 17, and the changeover ball 14 being in one body with the take-up drum 5 through the cam holder 4 results in turning upward along the take-up groove 25 in FIG. 4[A], and when the changeover ball 14 is turned upward in the same figure, the cam spline 3 moves to the right in FIG. 4[A] at the bent portion 30 provided on the way of this take-up groove 25 and the return groove 27 advances to the changeover ball 14 and further the return groove 27 moves along the changeover ball 14, and thereby as shown in FIGS. 4[B] to [C], the cam spline 3 moves to a position where the draw-out groove 24 is engaged with the changeover ball 14.

Said cam spline 3 comes to be rightmost in FIG. 1 relative to the changeover ball 14, and the changeover ball 14 can be consecutively turned upward relative to the draw-out groove 24 in FIG. 4[C], and thereby the sheet A can be drawn out by a necessary length.

And when said take-up drum 5 is turned in the draw-out direction of the sheet A, the coil spring 20 of the elastic force providing means 18 is tightly wound up between the turning take-up drum 5 and the stationary first support shaft 1 to accumulate the elastic energy in the sheet take-up direction for the take-up drum 5.

When the lower end of the sheet A is drawn out slightly beyond a desired hanging position and then the drawing force is removed, the take-up drum 5 is turned in the sheet take-up direction by the elastic energy accumulated in the elastic force providing means 18 and the changeover ball 14 turned as one body with this is turned downward along the draw-out groove 24 in FIG. 4[C], and the cam spline 3 is moved to the left in FIG. 1 at the bent portion 31 provided on the way of the draw-out groove 24 by this turning of the changeover ball 14 and thereby the engagement groove 26 advances to the changeover ball 14, and as shown in FIG. 5[D], the fixing engagement portion 28 provided on the way of the engagement groove 26 engages with the changeover ball 14 and the changeover ball 14 stops turning and thereby the take-up drum 5 is regulated so as not to be turned in the sheet take-up direction to come into a fixed state.

Due to a fact that the take-up drum 5 stops in such a way, the lower end of the sheet A comes to a nearly desired hanging position.

Next, the sheet A drawn out is taken up by slightly drawing down the sheet A and then removing the drawing force.

When the sheet A is slightly drawn downward in a state of FIG. 5[D], the take-up drum 5 and the changeover ball 14 are turned upward in the draw-out direction in FIG. 5[D], the cam spline 3 is moved to the left side in the same figure by this turning and as shown in FIG. 5[E], the changeover engagement portion 29 is engaged with the changeover ball 14, and the changeover ball 14 stops turning and thereby the take-up drum 5 stops turning in the sheet draw-out direction and therefore drawing downward the sheet A is regulated.

When a force of drawing out the sheet A is cancelled at this point of time, the take-up drum 5 and the changeover ball 14 are turned by the elastic force accumulated in the elastic force providing means 18 in the sheet take-up direction downward in FIG. 5[E], and the cam spline 3 is moved to the left in FIG. 5[E] by this turning of the changeover ball 14 from the changeover engagement portion 29 to the engagement groove 26 to come into a phase in which the take-up groove 25 is engaged with the changeover ball 14 and as shown by an arrow of FIG. 5[F], the changeover ball 14 is made to freely turn in the take-up direction relative to the take-up drum 5, and therefore the whole length of the sheet A drawn out results in being taken up by the take-up drum 5.

And in case of stopping said sheet A on the way of taking up, it is enough to stop and draw down the sheet on the way of taking up, and by the same operation as the operation of drawing out the sheet as described above, the cam spline 3 is moved to a position where the draw-out groove 24 is engaged with the changeover ball 14, and when the down drawing of the sheet A is cancelled, the cam spline 3 is moved to a position where the fixing engagement portion 28 is engaged with the changeover ball 14, and taking up the sheet A is stopped.

As described above, since the present utility model makes a cam spline having an endless cam groove provided on its outer circumferential face move freely in the axial direction, makes a changeover ball to turn as one body with a sheet take-up drum engage with the cam groove, and stops and takes up the drawn-out sheet by movement of the cam spline performed by turning of the changeover ball, it is possible to draw out and stop the sheet without using a one-way clutch and to simplify the device in structure and reduce it in manufacturing cost by reducing the number of components.

And since the present utility model moves the cam spline in the axial direction, the load on the changeover ball is made small and the sheet can be smoothly drawn out and taken up.

What is claimed is:

1. A sheet take-up device for a projection screen comprising;

a cam spline which is attached to a fixed support shaft so as to be unable to turn and able to move in the axial direction and has an endless cam groove provided on its outer circumferential face, a cam holder supported on the outer circumferential face of this cam spline so as to be able to turn, a sheet take-up drum fixed to the outer circumferential face of the cam holder so as to turn as one body with said cam holder, a changeover ball held by said cam holder at a fixed position so as to engage with said cam groove, and a take-up elastic force providing means which is provided between said support shaft and said take-up drum and accumulates the elastic energy in the sheet take-up direction for the take-up drum by the rotation in the sheet draw-out direction of the take-up drum, wherein;

said endless cam groove provided on the outer circumferential face of said cam spline is formed out of a draw-out groove and a take-up groove which are spaced in the axial direction and ring-shaped in the circumferential direction, and an engagement groove and a return groove which make said draw-out groove and said take-up groove communicate with each other, said engagement groove is provided with a fixing engagement portion for making the cam spline and the changeover ball engage with each other so as not to turn the take-up drum in the sheet take-up direction and a changeover engagement portion for releasing said engaged state by turning of the changeover ball in the sheet take-up direction, said fixing engagement portion and changeover engagement portion being curved in directions opposite to each other with respect to the circumferential direction of the cam spline, said take-up groove moves the cam spline so that the return groove advances to the changeover ball by turning of the changeover ball in the sheet draw-out direction, said return groove moves the cam spline so that the draw-out groove advances to the changeover ball by turning of the changeover ball in the sheet draw-out direction, and said draw-out groove moves the cam spline so that the engagement groove advances to the changeover ball by turning of the changeover ball in the sheet draw-out direction.

2. A sheet take-up device for a projection screen according to claim 1, wherein;

said cam spline is fitted onto the outer circumference of a spline shaft fitted and fixed onto the support shaft and is coupled with the spline shaft so as to able to freely move in the axial direction and unable to turn relative to the spline shaft by interposing balls between spline grooves respectively provided in the inner circumferential face of the cam spline and in the outer circumferential face of the spline shaft.

3. A sheet take up device for a projection screen according to claim 2, wherein;

a speed regulating mechanism for regulating the turning speed in the sheet take-up direction of the take-up drum so that said turning speed does not become too high is provided between said support shaft and said take-up drum, and this speed regulating mechanism is formed using an oil rotation damper.

4. A sheet take up device for a projection screen according to claim 1, wherein, a speed regulating mechanism for regulating the turning speed in the sheet take-up direction of the take-up drum so that said turning speed does not become too high is provided between said support shaft and said take-up drum, and this speed regulating mechanism is formed using an oil rotation damper.

* * * * *